(12) United States Patent
Shih et al.

(10) Patent No.: US 6,780,811 B2
(45) Date of Patent: Aug. 24, 2004

(54) CATALYST COMPOSITION FOR LIVING FREE RADICAL POLYMERIZATION AND PROCESS FOR POLYMERIZING (METH) ACRYLIC, VINYL, VINYLIDENE, AND DIENE MONOMERS USING THE CATALYST COMPOSITION

(75) Inventors: Kuo-Chen Shih, Kaohsiung (TW); Li-Jiun Chen, HsinChu (TW); Yu-Shan Chao, HsinChu (TW)

(73) Assignee: Industrial Technology Research Institute, Hsinchu (TW)

( * ) Notice: Subject to any disclaimer, the term of this patent is extended or adjusted under 35 U.S.C. 154(b) by 107 days.

(21) Appl. No.: 10/100,989

(22) Filed: Mar. 20, 2002

(65) Prior Publication Data

US 2003/0158034 A1 Aug. 21, 2003

(30) Foreign Application Priority Data

Dec. 24, 2001 (TW) ........................................ 90132084 A

(51) Int. Cl.⁷ ............................................... B01J 31/00
(52) U.S. Cl. ...................... 502/150; 502/152; 502/153; 502/155
(58) Field of Search ................................ 502/150, 152, 502/153, 155, 162, 167, 168; 526/145, 172, 93, 161

(56) References Cited

U.S. PATENT DOCUMENTS 5,968,322 A * 10/1999 Arnoldy et al. ................ 203/6

FOREIGN PATENT DOCUMENTS

EP WO 97/17320 A1 * 5/1997 ........... C07C/67/38

* cited by examiner

Primary Examiner—Mark L. Bell
Assistant Examiner—Jennine M. Brown
(74) Attorney, Agent, or Firm—Sughrue Mion, PLLC

(57) ABSTRACT

A catalyst composition for living free radical polymerization. The catalyst composition includes a transition metal complex $MX_p$ and a ligand, wherein M is a transition metal; X is halogen, $-NO_2$, $-NCS$, $-NCO$, $-SCN$, $-CN$, $-N_3$, $-SO_4$, carboxylate group, or $-PF_6$; p is the valence of the transition metal, the ligand is represented by formula (I):

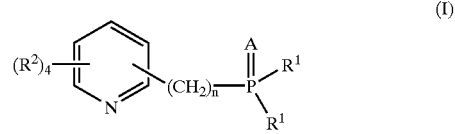

wherein $R^1$ can be the same or different and is $C_{1-20}$ alkyl, $C_{6-20}$ aryl, $C_{7-20}$ alkylaryl, $C_{7-20}$ arylalkyl, or heterocyclic groups; $R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups; n is an integer of 0 to 6; and A is deleted or an S or O atom, wherein the molar ratio of the transition metal complex $MX_p$ and the ligand is 1 to 4. The catalyst composition of the present invention can be used to polymerize (meth)acrylic, vinyl, vinylidene, and diene monomers, and the polymer obtained has narrow polydispersity.

11 Claims, No Drawings

CATALYST COMPOSITION FOR LIVING FREE RADICAL POLYMERIZATION AND PROCESS FOR POLYMERIZING (METH) ACRYLIC, VINYL, VINYLIDENE, AND DIENE MONOMERS USING THE CATALYST COMPOSITION

BACKGROUND OF THE INVENTION

1. Field of the Invention

The present invention relates to a catalyst composition for living free radical polymerization, and more particularly to a process for preparing a polymer with narrow polydispersity using the catalyst composition.

2. Description of the Prior Art

Radical polymerization is one of the polymerization processes which are most widely exploited industrially because of the variety of the polymerizable monomers (50% of the commercial monomers), of the ease of application and of the synthesis processes employed (emulsion, suspension, bulk, solution). However, in conventional radical polymerization it is difficult to control the size of the polymer chains and the molecular mass distribution. The polymers thus prepared contain chains of very large and very small masses (broad polydispersity), and this results in materials with uncontrolled properties. In addition, the sequential addition of monomer produces a mixture of homopolymers.

Anionic and cationic polymerization techniques, for their part, allow proper control of the process, but the reaction conditions required are not always capable of being implemented on an industrial scale. In addition, many monomers cannot be polymerized using these techniques.

Matyjaszewski in U.S. Pat. No. 5,763,548 mainly uses a CuCl/bipyridine catalyst system to effectively control the free radical polymerization of a monomer such as styrene, acylates, methyl methacrylate (MMA) in the presence of an alkyl halide initiator. However, this system suffers from that a large amount of catalyst must be used and the activity is not high enough. Therefore, there is a need to develop a catalyst system with high activity.

SUMMARY OF THE INVENTION

An object of the present invention is to solve the above-mentioned problems and to provide a catalyst composition that can be used to synthesize polymers through living free radical polymerization with high activity. There is no need to isolate the catalyst composition, and in the presence of a suitable initiator, the catalyst composition can be directly reacted with a monomer in situ, that is, directly reacted with a monomer in the state when each component is mixing.

Another object of the present invention is to provide a process for preparing polymers through living free radical polymerization using the catalyst composition of the present invention. The polymer obtained has narrow polydispersity.

To achieve the above objects, the catalyst composition for living free radical polymerization of the present invention includes a transition metal complex $MX_p$ and a ligand.

In the transition metal complex $MX_p$, M is a transition metal, X is halogen, $-NO_2$, $-NCS$, $-NCO$, $-SCN$, $-CN$, $-N_3$, $-SO_4$, carboxylate group, or $-PF_6$, p is the valence of the transition metal.

The ligand is represented by formula (I):

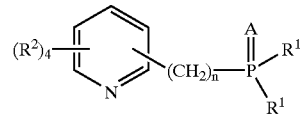

wherein $R^1$ can be the same or different and is $C_{1-20}$ alkyl, $C_{6-20}$ aryl, $C_{7-20}$ alkylaryl, $C_{7-20}$ arylalkyl, or heterocyclic groups; $R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups; n is an integer of 0 to 6; and A is deleted or an S or O atom.

The molar ratio of the transition metal complex $MX_p$ and the ligand is 1 to 4.

The process for preparing polymers through living free radical polymerization of the present invention involves contacting a monomer and a catalytically effective amount of the above-mentioned catalyst composition with a compound capable of generating free radicals to undergo homopolymerization or copolymerization. Suitable monomer can be a (meth)acrylic, vinyl, vinylidene, diene, or mixtures thereof.

DETAILED DESCRIPTION OF THE INVENTION

The present invention provides a catalyst composition for living free radical polymerization. Using the catalyst composition of the present invention, a monomer can undergo homopolymerization or copolymerization in the presence of a compound capable of generating free radicals through living free radical polymerization. Polymers with narrow polydispersity can be obtained.

The catalyst composition of the present invention includes a transition metal complex $MX_p$ and a ligand. The molar ratio of the transition metal complex $MX_p$ and the ligand is preferably 1 to 4.

In the transition metal complex $MX_p$, M is a transition metal, such as Fe, Co, Ni, Cu, Rh, Ir, Pd, Pt, Ru, or Re. X can be a halogen or a pseudohalogen such as $-NO_2$, $-NCS$, $-NCO$, $-SCN$, $-CN$, $-N_3$, $-SO_4$, carboxylate group, or $-PF_6$. p is the valence of the transition metal.

The compound capable of generating free radicals suitable for use in the present invention is not limited and can be any suitable for use in the conventional free radical polymerization, such as AIBN, diacyl peroxides, and di-tert-butyl peroxide. Alkyl halide compounds can also be used. Representative examples include 1-phenylethyl chloride, 1-phenylethyl bromide, 2-bromoisobutyric acid ethyl ester, ethyl 2-bromo-2-methylpropionate, bromoacetonitrile, 2-bromopropionitrile, 2-bromoisobutyrophenone, carbon tetrachloride, chloroform, carbon tetrabromide, 2,2,2-tribromoethanol, bromotrichloromethane, or organic compounds containing multiple halogen substituents such as:

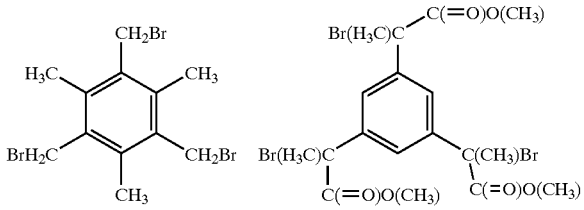

The present invention uses a particular ligand represented by formula (I):

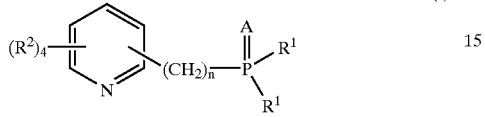

(I)

wherein $R^1$ can be the same or different and is $C_{1-20}$ alkyl, $C_{6-20}$ aryl, $C_{7-20}$ alkylaryl, $C_{7-20}$ arylalkyl, or heterocyclic groups; $R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups; n is an integer of 0 to 6; and A is deleted or an S or O atom.

According to a preferred embodiment of the present invention, the ligand can be

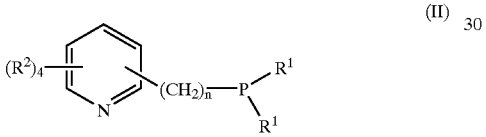

(II)

wherein
$R^1$ can be the same or different and is $C_{1-20}$ alkyl, $C_{6-20}$ aryl, $C_{7-20}$ alkylaryl, $C_{7-20}$ arylalkyl, or heterocyclic groups;
$R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups; and
n is an integer of 0 to 6.

A representative example of formula (II) is

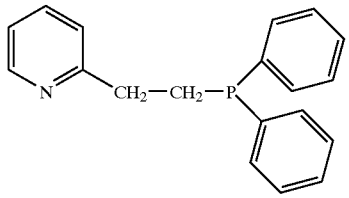

In formula (II), when n=0, the ligand is

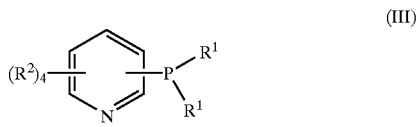

(III)

wherein
$R^1$ can be the same or different and is $C_{1-20}$ alkyl, $C_{6-20}$ aryl, $C_{7-20}$ alkylaryl, $C_{7-20}$ arylalkyl, or heterocyclic groups; and
$R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups.

Representative examples of formula (III) include 2-pyridyl diphenylphosphine

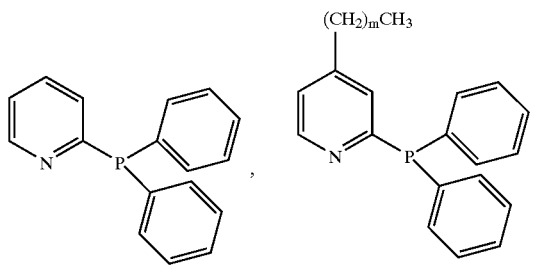

wherein m is an integer of 0 to 8, and

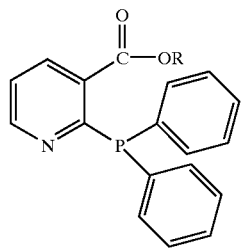

wherein R is alkyl having 1 to 8 carbon atoms.

According to another preferred embodiment of the present invention, the ligand can be

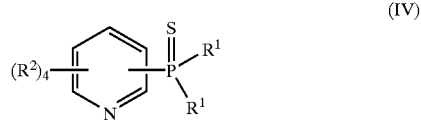

(IV)

wherein
$R^1$ can be the same or different and is $C_{1-20}$ alkyl, $C_{6-20}$ aryl, $C_{7-20}$ alkylaryl, $C_{7-20}$ arylalkyl, or heterocyclic groups; and
$R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups.

A representative example of formula (IV) is

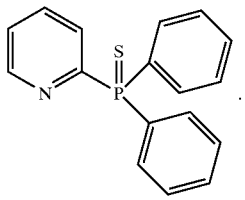

The catalyst composition of the present invention can be used to polymerize at least one monomer of (meth)acrylic, vinyl, vinylidene, and diene monomers. The transition metal complex $MX_p$ and the ligand of formula (I) as mentioned above are mixed to prepare a catalyst composition. Then, in the presence of a compound capable of generating free radicals, one or more monomers as mentioned above is contacted with a catalytically effective amount of the catalyst composition to undergo homopolymerization or copolymerization. Various conventional polymerization methods such as emulsion, bulk, suspension, and solution polymerization can be used.

As mentioned above, the monomer suitable for use in the present invention can be at least one monomer of (meth)acrylics, vinyls, vinylidenes, or dienes. The vinyl can be an aromatic vinyl, and representative examples include styrene and its derivatives. Representative examples of the (meth)acrylic include methyl methacrylate, butyl methacrylate, methyl acrylate, butyl acrylate, 2-hydroxyethyl acrylate, acrylonitrile, acrylamide, N,N-dimethyl acrylamide. Representative examples of the diene include isoprene and butadiene.

As mentioned above, the catalyst composition of the present invention includes the transition metal $MX_p$ and the ligand of formula (I). It should be noted that, according to the process of the present invention, there is no need to react the transition metal and the ligand and then isolate the catalyst product. The catalyst composition can be directly reacted with the monomer in situ, that is, directly reacted with the monomer when the transition metal $MX_p$ and the ligand of formula (I) is in a mixing state. Therefore, the procedures of isolating and purifying the catalyst can be saved and thus the cost is saved.

Moreover, using the catalyst composition of the present invention to catalyze the polymerization of (meth)acrylic and/or vinyl and/or vinylidene and/or diene, a polymer with narrow polydispersity (PDI) is obtained, and the PDI can be as small as 1.05 to 2, preferably 1.05 to 1.3.

Using the catalyst composition of the present invention, the polymer obtained can be a homopolymer or a copolymer. Various copolymers with a well-defined structure can be obtained, including (1) "pure" block copolymers (two or more blocks) with narrow polydispersity, (2) graft copolymers with narrow polydispersity, (3) gradient copolymers, (4) star copolymers, and (5) hyperbranched copolymers. Various polymers with a terminal functional group can also be prepared. The emergence of various novel polymers can provide new materials with novel properties, or enhance the performance of existing products. The polymer materials developed in the present invention can be applied in many fields, including dispersants such as pigment dispersants in ink, photoresists, surfactants, surface treating agents, adhesives, rheology controllers, coatings, and thermoplastic elastomers.

The following examples are intended to illustrate the process and the advantages of the present invention more fully without limiting its scope, since numerous modifications and variations will be apparent to those skilled in the art.

EXAMPLES 1 TO 2

Solution Polymerization of Styrene 1-phenylethyl chloride, $FeCl_2$, and 2-pyridyl diphenylphosphine were charged in a 50 ml round bottle in a nitrogen glove box. The bottle was sealed with a septum and transferred out of the glove box. Styrene and xylene (50 v/v %) were injected into the bottle by a syringe under nitrogen. The round bottle was placed in a 110° C. oil bath to undergo polymerization. The molar ratios of styrene, $FeCl_2$, 2-pyridyl diphenylphosphine, and 1-phenylethyl chloride were 100:1:2:1. After a suitable reaction time, the round bottle was quickly cooled down with cold water. The conversion rate of the monomer, and molecular weight and polydispersity of the polymer were monitored by GC (gas chromatography) and GPC (gel permeation chromatography). The polymer was purified by the following method. The polymer product was dissolved with a suitable solvent such as THF and allowed to flow through a basic alumina column to separate the metal catalyst. A suitable solvent such as methanol was used to precipitate out the product, which was then dried under vacuum for more than 24 hours. The results are shown in Table 1. Mn(cal) indicates the theoretical value of number average molecular weight of the polymer calculated from the conversion rate of monomer, and Mn(GPC) the number average molecular weight determined by GPC. PDI equals to Mw/Mn.

TABLE 1

| Example | Reaction time (hr) | Conversion rate (%) | Mn (cal) | Mn (GPC) | PDI |
|---------|--------------------|--------------------|----------|----------|-----|
| 1 | 4 | 34 | 3604 | 4080 | 1.22 |
| 2 | 7.5 | 48 | 4999 | 5257 | 1.22 |

EXAMPLES 3 TO 5

Bulk Polymerization of Styrene 1-phenylethyl chloride, $FeCl_2$, and 2-pyridyl diphenylphosphine were charged in a 50 ml round bottle in a nitrogen glove box. The bottle was sealed with a septum and transferred out of the glove box. Styrene was injected into the bottle by a syringe under nitrogen. The round bottle was placed in a 110° C. oil bath to undergo polymerization. The molar ratios of styrene, $FeCl_2$, 2-pyridyl diphenylphosphine, and 1-phenylethyl chloride were 100:1:2:1. After a suitable reaction time, the round bottle was quickly cooled down with cold water. The conversion rate of the monomer, and molecular weight and polydispersity of the polymer were monitored by GC and GPC. The polymer was purified by the following method. The polymer product was dissolved with a suitable solvent such as THF and allowed to flow through an alumina column to separate the metal catalyst. A suitable solvent such as methanol was used to precipitate out the product, which was then dried under vacuum for more than 24 hours. The results are shown in Table 2.

TABLE 2

| Example | Reaction time (hr) | Conversion rate (%) | Mn (cal) | Mn (GPC) | PDI |
|---------|--------------------|--------------------|----------|----------|-----|
| 3 | 2 | 47 | 4895 | 3356 | 1.28 |
| 4 | 4 | 72 | 7489 | 5978 | 1.22 |
| 5 | 6 | 85 | 12195 | 10082 | 1.30 |

EXAMPLE 6

Bulk Polymerization of Styrene $FeCl_3$, AIBN, and 2-pyridyl diphenylphosphine were charged in a 50 ml round bottle in a nitrogen glove box. The bottle was sealed with a septum and transferred out of the glove box. Styrene was injected into the bottle by a syringe under nitrogen. The round bottle was placed in a 110° C. oil bath to undergo polymerization. The molar ratios of styrene, $FeCl_3$, 2-pyridyl diphenylphosphine, and AIBN were 100:1:2:1. After 15 hours of reaction, the round bottle was quickly cooled down with cold water. The conversion rate of the monomer, and molecular weight and polydispersity of the polymer were monitored by GC and GPC. The conversion rate of the monomer was 71%, the number average molecular weight was 9400, and the polydispersity was 1.23.

EXAMPLE 7

Bulk Polymerization of Styrene $FeCl_2$, 1-phenylethyl chloride, and $Py\text{-}(CH_2)_2PPh_2$ were charged in a 50 ml round bottle in a nitrogen glove box. The bottle was sealed with a septum and transferred out of the glove box. Styrene was injected into the bottle by a syringe under nitrogen. The round bottle was placed in a 110° C. oil bath to undergo polymerization. The molar ratios of styrene, $FeCl_2$, $Py\text{-}(CH_2)_2PPh_2$, and 1-phenylethyl chloride were 100:1:2:1. After 5 hours of reaction, the round bottle was quickly cooled down with cold water. The conversion rate of the monomer, and molecular weight and polydispersity of the polymer were monitored by GC and GPC. The conversion rate of the monomer was 61%, the number average molecular weight was 7207, and the polydispersity was 1.48.

EXAMPLE 8

Bulk Polymerization of Styrene $FeCl_2$, 1-phenylethyl chloride, and $Py\text{-}P(=S)Ph_2$ were charged in a 50 ml round bottle in a nitrogen glove box. The bottle was sealed with a septum and transferred out of the glove box. Styrene was injected into the bottle by a syringe under nitrogen. The round bottle was placed in a 110° C. oil bath to undergo polymerization. The molar ratios of styrene, $FeCl_2$, $Py\text{-}P(=S)Ph_2$, and 1-phenylethyl chloride were 100:1:2:1. After 18 hours of reaction, the round bottle was quickly cooled down with cold water. The conversion rate of the monomer, and molecular weight and polydispersity of the polymer were monitored by GC and GPC. The conversion rate of the monomer was 33%, the number average molecular weight was 4048, and the polydispersity was 1.23.

EXAMPLE 9

Bulk Polymerization of Methyl Methacrylate $FeCl_2$, 2-bromoisobutyric acid ethyl ester, and 2-pyridyl diphenylphosphine were charged in a 50 ml round bottle in a nitrogen glove box. The bottle was sealed with a septum and transferred out of the glove box. Methyl methacrylate was injected into the bottle by a syringe under nitrogen. The round bottle was placed in a 80° C. oil bath to undergo polymerization. The molar ratios of methyl methacrylate, $FeCl_2$, 2-pyridyl diphenylphosphine, and 2-bromoisobutyric acid ethyl ester were 100:1:2:1. After 2.5 hours of reaction, the round bottle was quickly cooled down with cold water. The molecular weight and polydispersity of the polymer were monitored by GPC. The number average molecular weight was 7401 and the polydispersity was 1.28.

EXAMPLE 10

Solution Polymerization of Methyl Methacrylate $FeCl_2$, 2-bromoisobutyric acid ethyl ester, and 2-pyridyl diphenylphosphine were charged in a 50 ml round bottle in a nitrogen glove box. The bottle was sealed with a septum and transferred out of the glove box. Methyl methacrylate and toluene (50 v/v%) were injected into the bottle by a syringe under nitrogen. The round bottle was placed in a 80° C. oil bath to undergo polymerization. The molar ratios of methyl methacryalte, $FeCl_2$, 2-pyridyl diphenylphosphine, and 2-bromoisobutyric acid ethyl ester were 100:1:2:1. After 2.5 hours of reaction, the round bottle was quickly cooled down with cold water. The conversion rate of the monomer, and molecular weight and polydispersity of the polymer were monitored by GC and GPC. The conversion rate of the monomer was 52%, the number average molecular weight was 5901, and the polydispersity was 1.3.

EXAMPLE 11

Bulk Polymerization of Methyl Methacrylate $FeBr_2$, 2-bromoisobutyric acid ethyl ester, and 2-pyridyl diphenylphosphine were charged in a 50 ml round bottle in a nitrogen glove box. The bottle was sealed with a septum and transferred out of the glove box. Methyl methacrylate and toluene (50 v/v %) were injected into the bottle by a syringe under nitrogen. The round bottle was placed in a 80° C. oil bath to undergo polymerization. The molar ratios of methyl methacryalte, $FeBr_2$, 2-pyridyl diphenylphosphine, and 2-bromoisobutyric acid ethyl ester were 100:0.1:0.2:1. After 1 hour of reaction, the round bottle was quickly cooled down with cold water. The conversion rate of the monomer, and molecular weight and polydispersity of the polymer were monitored by GC and GPC. The conversion rate of the monomer was 52%, the number average molecular weight was 8053, and the polydispersity was 1.36.

EXAMPLES 12 TO 14

Bulk Polymerization of Butyl Methacrylate $FeBr_2$, 2-pyridyl diphenylphosphine, and 2-bromoisobutyric acid ethyl ester were charged in a 50 ml round bottle in a nitrogen glove box. The bottle was sealed with a septum and transferred out of the glove box. Butyl methacrylate was injected into the bottle by a syringe under nitrogen. The round bottle was placed in a 90° C. oil bath to undergo polymerization. The molar ratios of butyl methacryalte, $FeBr_2$, 2-pyridyl diphenylphosphine, and 2-bromoisobutyric acid ethyl ester were 100:1:2:1. After a suitable reaction time, the round bottle was quickly cooled down with cold water. The conversion rate of the monomer, and molecular weight and polydispersity of the polymer were monitored by GC and GPC. The results are shown in Table 3.

TABLE 3

| Example | Reaction time | Conversion rate (%) | Mn (cal) | Mn (GPC) | PDI |
| --- | --- | --- | --- | --- | --- |
| 12 | 20 min | 23 | 3266 | 5742 | 1.36 |
| 13 | 40 min | 48 | 6759 | 6419 | 1.4 |
| 14 | 180 min | 95 | 9588 | 10401 | 1.35 |

From the data of the above examples, it can be seen that by means of the catalyst composition of the present invention, the polymer obtained has a narrow polydispersity (PDI<1.5), which is far superior than the result for a conventional free radical polymerization. Moreover, the theoretical value and determined value for the molecular weight are very close. Therefore, it is very easy to control the molecular weight.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A catalyst composition for living free radical polymerization comprising:

a transition metal complex $MX_p$, a ligand, and a compound capable of generating free radicals, wherein M is a transition metal, X is halogen, —$NO_2$, —NCS, —NCO, —SCN, —CN, —$N_3$, —$SO_4$, carboxylate group, or —$PF_6$, p is the valence of the transition metal;

wherein the ligand is represented by formula (I):

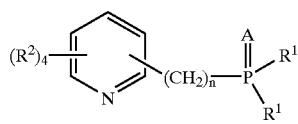

(I)

wherein $R^1$ can be the same or different and is $C_{1-20}$ alkyl, $C_{6-20}$ aryl, $C_{7-20}$ alkylaryl, $C_{7-20}$ arylalkyl, or heterocyclic groups; $R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups; n is an integer of 0 to 6; and A is deleted or an S or O atom, wherein the molar ratio of the transition metal complex $MX_p$ and the ligand is 1 to 4.

2. The catalyst composition as claimed in claim 1, wherein X is halogen.

3. The catalyst composition as claimed in claim 1, wherein the ligand is formula (II)

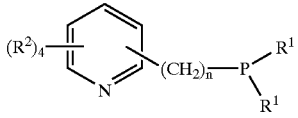

(II)

wherein $R^1$ can be the same or different and $C_{1-20}$ alkyl, $C_{6-20}$ aryl, $C_{7-20}$ alkylaryl, $C_{7-20}$ arylalkyl, or heterocyclic groups;

$R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups; and n is an integer of 0 to 6.

4. A catalyst composition for living free radical polymerization, comprising:

a transition metal complex $MX_p$ and a ligand, wherein M is a transition metal, X is halogen, —$NO_2$, —NCS, —NCO, —SCN, —CN, —$N_3$, —$SO_4$, carboxylate group, or —$PF_6$, p is the valence of the transition metal;

wherein the ligand is represented by formula (I):

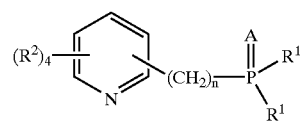

(I)

wherein $R^1$ can be the same or different and is $C_{1-20}$ alkyl, $C_{6-20}$ aryl, $C_{7-20}$ alkylaryl, $C_{7-20}$ arylalkyl, or heterocyclic groups; $R^2$ can be the same or different and is H, $C_{1-20}$ alkyl, $C_{6-20}$ aryl, $C_{7-20}$ alklaryl, $C_{7-20}$ arylalkyl, heterocyclic groups, alkyl sulfide groups, nitrile groups, alkylsilyl, or ester groups; n is an integer or 0 to 6; and A is deleted or an S or O atom, wherein the molar ratio of the transition metal complex $MX_p$ and the ligand is 1 to 4, wherein the transition metal M is Fe, Co, Cu, Rh, Ir, Ru, or Re.

5. A catalyst composition for living free radical polymerization comprising:

a transition metal complex $MX_p$ and a ligand, wherein M is a transition metal, X is halogen, —$NO_2$, —NCS, —NCO, —SCN, —CN, —$N_3$, —$SO_4$, carboxylate group, or —$PF_6$, p is the valence of the transition metal;

wherein the ligand is

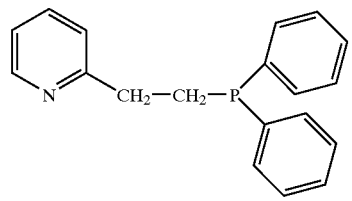

6. The catalyst composition as claimed in claim 3 wherein the ligand is

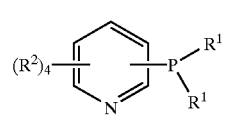

(III)

wherein $R^1$ can be the same or different and is $C_{1-20}$ alkyl, $C_{6-20}$ aryl, $C_{7-20}$ alkylaryl, $C_{7-20}$ arylalkyl, or heterocyclic groups; and $R^2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups.

7. The catalyst composition as claimed in claim 6, wherein the ligand is

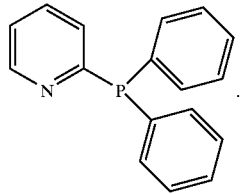

8. A catalyst composition for living free radical polymerization comprising:

a transition metal complex $MX_p$ and a ligand, wherein M is a transition metal, X is halogen, $-NO_2$, $-NCS$, $-NCO$, $-SCN$, $-CN$, $-N_3$, $-SO_4$, carboxylate group, or $-PF_6$, p is the valence of the transition metal;

wherein the ligand is

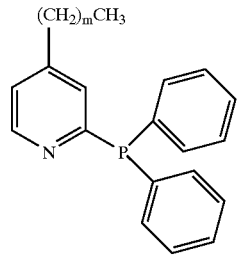

wherein m is an integer of 0 to 8.

9. A catalyst composition for living free radical polymerization comprising:

a transition metal complex $MX_p$ and a ligand, wherein M is a transition metal, X is halogen, $-NO_2$, $-NCS$, $-NCO$, $-SCN$, $-CN$, $-N_3$, $-SO_4$, carboxylate group, or $-PF_6$, p is the valence of the transition metal;

wherein the ligand is

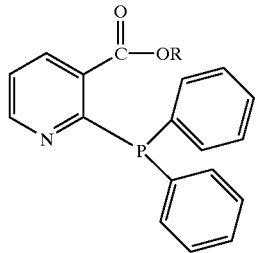

wherein R is alkyl having 1 to 8 carbon atoms.

10. A catalyst composition for living free radical polymerization comprising:

a transition metal complex $MX_p$ and a ligand, wherein M is a transition metal, X is halogen, $-NO_2$, $-NCS$, $-NCO$, $-SCN$, $-CN$, $-N_3$, $-SO_4$, carboxylate group, or $-PF_6$, p is the valence of the transition metal;

wherein the ligand is

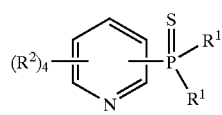

(IV)

wherein $R_1$ can be the same or different and is $C_{1-20}$ alkyl, $C_{6-20}$ aryl, $C_{7-20}$ alkylaryl, $C_{7-20}$ arylalkyl, or heterocyclic groups; and $R_2$ can be the same or different and is H, $C_{1-20}$ alkyl, $C_{6-20}$ aryl, $C_{7-20}$ alkylaryl, $C_{7-20}$ arylalkyl, heterocyclic groups, alkyl sulfide groups, nitrile groups, alkylsilyl, or ester groups.

11. The catalyst composition as claimed in claim 10, wherein the ligand is

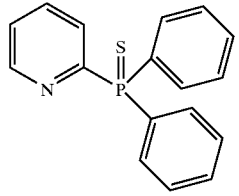

* * * * *